Dec. 13, 1932.  E. H. FUNDOM  1,890,728

POWER EXCAVATOR

Original Filed Jan. 7, 1929   3 Sheets-Sheet 1

INVENTOR.
Earl H Fundom.

BY
*Edwin P. ...*
ATTORNEYS.

INVENTOR.
Earl H. Fundom.

INVENTOR.
Earl H. Fundom.
BY
ATTORNEYS.

Patented Dec. 13, 1932

1,890,728

UNITED STATES PATENT OFFICE

EARL H. FUNDOM, OF KENTON, OHIO, ASSIGNOR, BY MESNE ASSIGNMENTS, TO THE MARION STEAM SHOVEL COMPANY, OF MARION, OHIO, A CORPORATION OF OHIO

POWER EXCAVATOR

Continuation of application Serial No. 330,748, filed January 7, 1929. This application filed November 11, 1929. Serial No. 406,398.

My invention relates to power excavators. It has to do particularly with that class of devices generally known as power shovels, although capable of use with various attachments such as "back-hoe", clam shell, drag line and pile driver attachments.

One of the objects of my invention is the provision of an excavator with a novel arrangement of the mechanism which is utilized for driving the excavator when it is being transported from place to place, for rotating the cab of the excavator upon its chassis or for steering such excavator during its transportation from point to point. In this connection, the novel arrangement of this actuating mechanism is such as to greatly simplify and reduce the number of parts necessary to accomplish the desired results. It is also such as to permit the disposition of the main driving shaft above the floor of the cab and in such relation to the driven parts that these driven parts are extremely few in number and are so disposed as to increase the clearance of the machine below the chassis.

Another object of my invention consists in the provision of a novel type of anti-friction means for supporting the cab of my device upon its chassis. This anti-friction means is of such a nature that its parts may be adjusted to maintain them in proper relation. Furthermore, it is of such structure that it will afford an unusual resistance to lateral thrusts such as are especially prevalent in excavators, with the result that my excavator will be peculiarly free from tipping.

Furthermore, another object of my invention lies in the provision of a novel means for locking the crawlers against both forward and reverse movement. This locking means is so formed that one section thereof continuously rides the crawler plates during forward motion and should the excavator become inoperative while going up a hill the locking means will automatically engage the crawlers to preclude rearward movement of the machine.

Another object of my invention consists in the use of a power unit which is so mounted on the turntable or cab of my device that it will be adequately balanced by the other parts of the shovel which serves to eliminate the use of any counterbalance on the shovel proper.

Still another object of my invention lies in the provision of a supplement for the differential assembly for the tractor motor whereby the axle shafts will be made to rotate in unison and at the same speed.

This application is a continuation of my application Serial No. 330,748, filed January 7, 1929.

The preferred embodiment of my invention is shown in the accompanying drawings wherein similar characters of reference designate corresponding parts and wherein.

Figure 1:
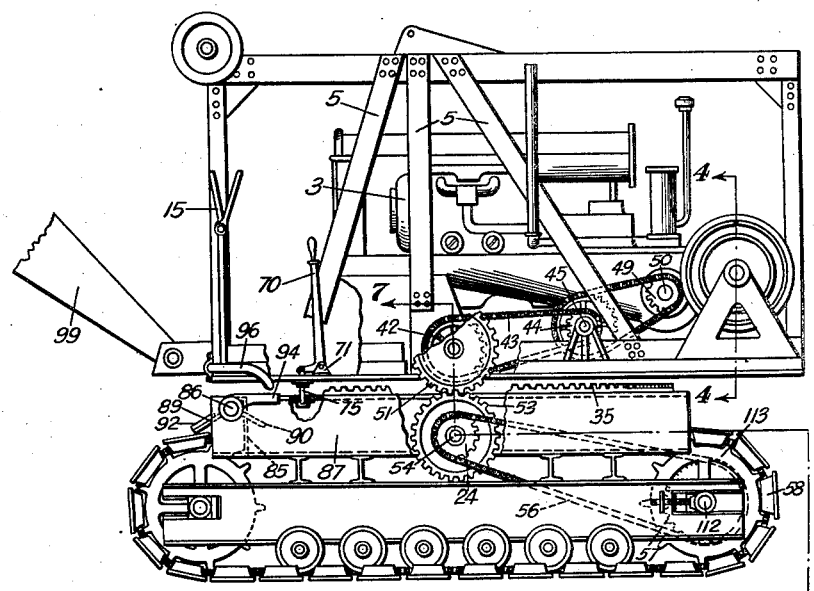
Figure 1 is a side elevation of my excavator with certain of the parts thereof broken away.

In the drawings, my invention is shown as comprising an excavator chassis having a turntable 1 rotatably supported thereon. The chassis proper is mounted on endless traction devices 58 which may be of any type desired, as long as they operate in a suitable manner for the purposes hereinafter set forth. These traction devices 58 are operable by means of a standard tractor unit. This tractor unit is shown by the numeral 3, and it is mounted on the floor of the turntable 1 on suitable supports, one support being placed under the forward end of the unit and the other support mounted in connection with the rear axle.

Figure 7:
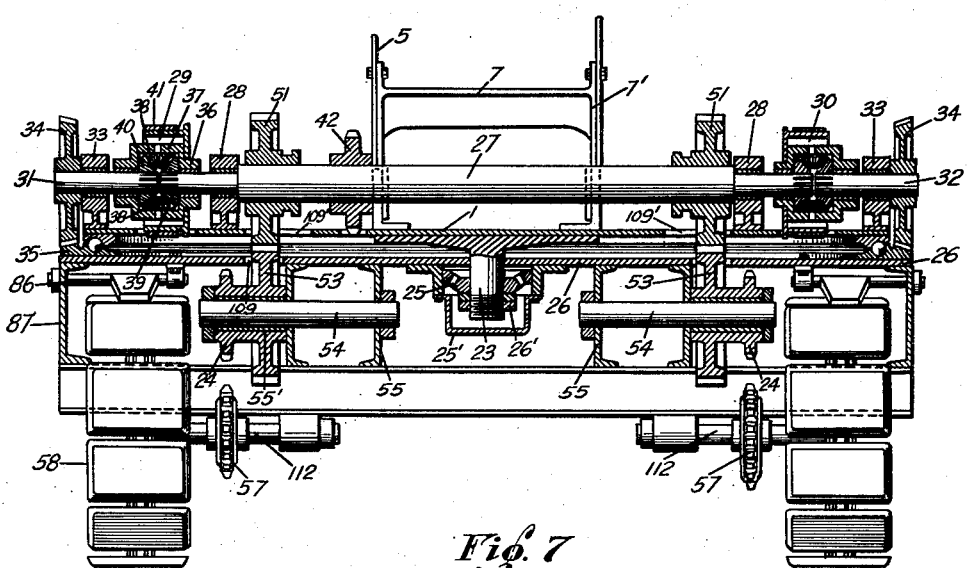
Figure 7 is a transverse section of my apparatus with certain of the parts removed and particularly showing my dual bearing structure, the jack shaft, and assembly for operating the crawlers and rotating the cab.

The tractor unit 3 is supported at the forward end by means of a casting 7, better shown in Figure 7. This casting 7 preferably comprises a cross member, having depending side walls 7' formed integrally therewith, the side plates 7' being riveted or bolted to the upright braces 5, which are in turn riveted or bolted to the floor of the turntable of the machine. It will readily be seen that suitable openings may be provided in the upper surface of the casting 7, Figure 7, through which suitable bolts may be passed to rigidly secure the forward end of the power unit to this casting.

This supporting structure is such that the forward half of this tractor unit is disposed directly over the center pin structure, hereinafter described, about which the cab rotates when it is being swung from one side to the other.

Figure 4:
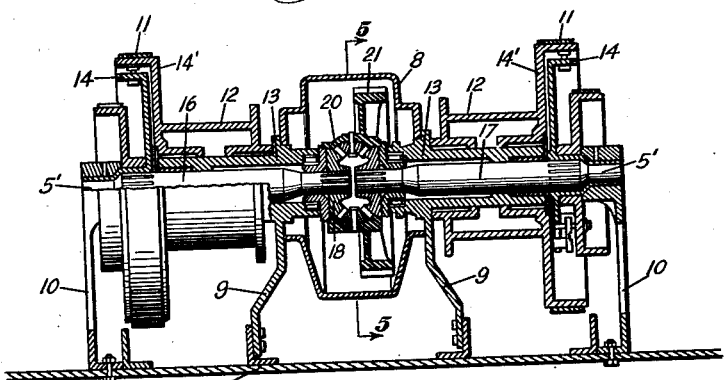
Figure 4 is a transverse sectional view of the excavator rear axle of the excavator motor taken on line 4—4 of Figure 1.

The differential housing 8, Figure 4, is supported by means of the uprights 9 that are securely bolted to the floor of the turntable 1 of the cab. These members are also preferably welded, riveted or bolted to the external sides of the axle housing 8. Each upright 9 is also provided with an integrally formed sleeve-like housing 13 that extends at substantially right angles to the uprights 9. Each housing 13 is adapted to enclose one of the axle shafts 16 or 17, but it is not adapted to contact therewith. That is, the axle rotates freely within the housing 13, without danger of binding thereagainst.

In addition to these upright supports I have provided the A-frame structures 10 that are disposed adjacent each end of the axle shafts 16 and 17 and are securely bolted to the floor of the turntable 1. These A-frame structures are each provided with bearings 5', at the upper ends thereof wherein the outer ends of the respective axle shafts are journaled. A clutch mechanism is also mounted on each shaft adjacent the end supported by the A-frame structure, and each clutch mechanism is adapted to drive a winding drum 12.

The clutch mechanism may be of any type desired, wherein there is a driving member as at 14 adapted to be mounted on the axle shaft and to rotate therewith, and a driven section as at 14', adapted to be driven intermittently by the driving section. In this instance, the driven section 14' forms a part of the winding drum. The numeral 11 designates a brake band that is mounted around the flange of the winding drum. Suitable levers (not shown) may be provided for operating this band to hold the winding drum stationary at the time when the driving member 14 is not operating to rotate the drum.

The hoisting drums 12, Figure 4, are adapted to be separately mounted on one of the housings 13 that enclose a section of the respective axle shaft inserted therethrough. These hoisting drums are rotatable about the housings 13, it being desirous to lubricate the surface of the housing 13 prior to mounting the drums 12 thereon. As will be noted, these hoisting drums 12 lie adjacent the axle housing 8 and on either side thereof, and they are provided at their outermost ends with the integrally formed wall 14' forming the driven section of the clutches 14 as hereinbefore mentioned.

It will be noted that by the provision of the housing 13 I have entirely eliminated any possibility of the axle shafts binding. This has been accomplished by mounting the hoisting drum 12 directly on the housing 13 and not on the axle shafts. The axle is free to rotate, and is not burdened with the stresses and strains usually encountered when the drum is mounted directly on the axle.

Figure 5:
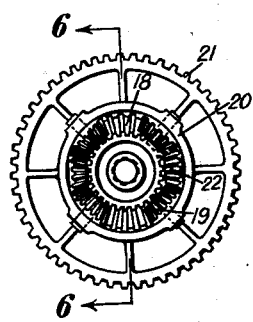
Figure 5 is a section taken on the line 5—5 of Figure 4 with some of the parts removed.
Figure 6:
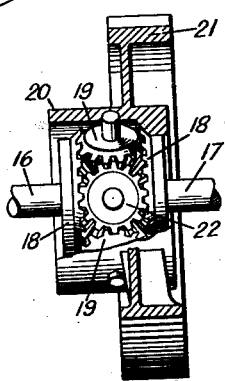
Figure 6 is a view partially in section taken on line 6—6 of Figure 5 showing the novel pinion arrangement whereby I obtain the simultaneous rotation of both axle shafts.

The rear axles which are numbered 16 and 17 respectively are provided with the usual type of bevel gears 18 mounted on their inner ends, Figures 4 and 6. These bevel gears 18 are provided with the ordinary pinions 19 carried in the box structure 20 to which is rigidly secured the ring gear 21. In the ordinary differential assembly there are usually four pinions, as at 19, Figure 5, carried by the box structure 20. These pinions are, as a rule, oppositely disposed and are engaged with the bevel gears 18. The purpose of such a differential assembly is well known to those familiar with the art, and the main purpose of such assembly is to allow one axle shaft to rotate at a greater speed than the other axle shaft. In this present invention, it is desirable that both axles rotate in unison and at exactly the same speed.

In accomplishing this result, I have interposed two idler pinions shown at 22, Figure 5, between the pinions 19. The pinions 22 are not journaled in the box structure 20. They are adapted to mesh with the pinions between which they are inserted and with the bevel gears 18, as shown in Figure 6, but otherwise they are unsupported.

With the inclusion of the pinions 22 it will be impossible for the pinions 19 to rotate. It can clearly be seen that at this time the tendency of the pinions 19 to rotate would tend to cause the auxiliary pinions 22, Figure 6, to rotate in opposition thereto thus holding the belt gears 18 in fixed position and causing the axle shafts to rotate simultaneously. The insertion of the auxiliary pinions serve to lock all of the gears within the assembly.

The turntable 1 is provided with a center pin 23, Figure 7. This center pin 23 depends from the under side of the turntable 1 and is immovably secured thereto. The lower end of this member is mounted in a roller bearing 25 that is carried in a suitable housing under the plate 26 which forms the bed plate of the crawler chassis. This center pin and bearing are preferably disposed below the forward end of the tractor unit 3. The center pin 23 is threaded on its lower end and a nut 26' is mounted thereon for the purpose of tightening or loosening the center pin. A second nut may be mounted to bear against this first nut to maintain it in the position desired. If desired, a dust cap as at 25' may be provided.

The turntable 1 is preferably provided with a transverse jack shaft 27 that is preferably mounted in bearing structures 28 rigidly bolted to the floor thereof. The bearing structures 28 are mounted adjacent each end of the shaft. This shaft 27 is provided at either end thereof with the planetary clutches 29 and 30 that are operatively connected to the stub shafts 31 and 32, Figures 2 and 7. Each stub shaft is journaled in a bearing member 33 and they are provided, at their outermost ends, with the gear wheels 34, Figures 3 and 7. Thus it can clearly be seen that the rotative action of the shaft 27 can be transmitted, by means of the planetary clutches, to the gear wheels 34 which are in mesh with a circular track 35, Figure 2, mounted on the plate 26, carried by the chassis. Traverse of the rack by the gears will serve to rotate the cab, each gear serving to rotate the cab in opposite directions. The shaft 27 may rotate continuously although the gears 34 are only subject to rotation at that time when the planetary clutches are operated.

The clutches 29 and 30, Figure 7, preferably comprise a circular casting 36 that is formed integrally with a circular pinion carrying box 37 wherein a plurality of pinions 38 are pivotally mounted. These pinions are in mesh with a bevel gear 40 carried on the stub shaft 31, and a bevel gear 39 carried on the main shaft 27. During rotation of the shaft 27 the circular casting 36, box 37, and the pinions 38 revolve therewith around the bevel gear 40 thus transmitting no rotative motion thereto, all being driven by the jack shaft 27. A brake band 41 is mounted around the circular casting 36. This brake band may be connected by means of suitable connecting rods to any one of the levers 15, Figure 1, disposed adjacent the driver's compartment. When the operator desires to rotate the cab about its axis one of the brake bands 41 is tightened thus stopping the rotation of the box 37 and holding the pinions 38 in immovable positions. This will cause the pinions to rotate about their respective axes to transmit the rotation of the main shaft 27 to the stub shafts 31. Either clutch may be operated separately to cause its respective gear 34 to traverse the rack.

The main axle shaft 27 is provided with a sprocket wheel 42, Figures 1 and 7, rigidly mounted thereon and rotatable therewith. This sprocket wheel 42 is connected by means of a chain 43, Figure 1, which meshes with the reduction sprocket 44, Figures 1, 2 and 3, mounted on the shaft 45 journaled on the frame 46 that is securely bolted to the floor of the turntable. A second sprocket 47 is also mounted on the shaft 45 and is of a greater diameter than the sprocket 44. Both sprockets are rigidly secured on the shaft 45 and are rotatable therewith. A chain 48 connects the sprocket 47 with a power take-off sprocket 49 that is mounted on one end of a shaft 50. The shaft 50 is connected by means of a bull gear 100, Figure 2, to a ring gear 101 mounted on the rear end of the drive shaft 102 of the power unit 3. It is by means of this system of sprockets and sprocket chains that the jack shaft 27 is driven. It can clearly be seen that this jack shaft may be controlled in its rotation by means of the regulation clutch 103 mounted in the tractor unit, inasmuch as the power take-off gear 49 is rotated by the drive shaft.

The shaft 50 is further provided at its other end with a gear 107. This gear is in mesh with the large ring gear 21 of the differential. It can be seen that through this system of gearing the axles 16 and 17, Figure 4, of the power unit and the jack shaft 27 may be rotated simultaneously and they may be controlled in their rotation by a common transmission and clutch, Figure 2. This feature will be hereinafter referred to.

The jack shaft 27, Figure 7, is further provided with the spur gears 51 respectively mounted adjacent opposing ends of the shaft. These gears 51 are slidably mounted on the jack shaft and they may be provided with suitable operating levers as at 108, Figure 2, for traversing them back and forth along the shaft towards and away from the end bearings 28.

Figure 2:
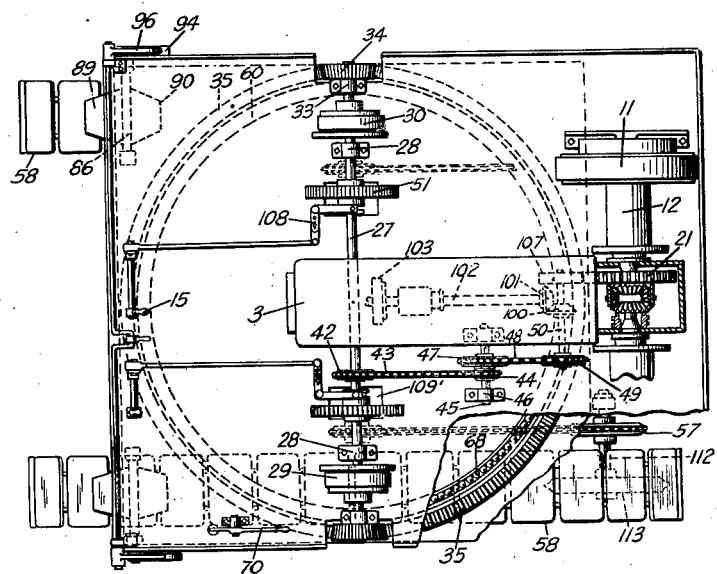
Figure 2 is a horizontal section showing a plan of the driving mechanism and co-related parts.

Each spur gear 51 is adapted to be brought into and out of meshing relation with a complemental gear 53, Figure 7, disposed below each of the gears 51. It will be understood that this is possible only at the time when the turntable 1 is brought into alignment with the crawler chassis. Each gear 53 is mounted on a separate axle shaft 54 journaled in suitable hangar members 55 depending from the plate 26 of the crawler chassis. Suitable openings 109, Figures 2 and 7, are provided in the plate 26 through which the periphery of the gears 53 extend and similar openings 109' are provided in the turntaole 1 through which the periphery of the gears 51 extend. It can clearly be seen that I may stop the rotation of the jack shaft 27 by disengaging the clutch of the power unit. At this time the system of levers as at 108, Figure 2, may be operated to move the gear or gears 51, singly or simultaneously, into meshing relation with their respective complemental gears 53, Figures 1, 2 and 7.

It will be understood that each crawler is operated in identically the same manner, there being two separate and distinct, yet identical sets of operating mechanism, Figure 2. These sets of operating mechanism are driven from one common shaft, namely, the shaft 27. The gears 53, which are rotatably mounted on the shaft 54 each have an integrally formed sprocket wheel 24, of much less diameter, mounted therewith. The gears 53, Figures 1 and 7, and the sprockets 24 are in reality mounted on a common sleeve 55', Figure 7, the sleeve being journaled on the axle 54 in suitable bearings. The sprocket chains 56, Figures 1, 2 and 7, are adapted to connect the sprockets 24 with the sprockets 57 that are mounted on the shafts 112 adjacent one end of the crawlers 58. The shafts 112 also carry the main sprockets 113 that comprise the main driving element of the crawlers.

Thus it can clearly be seen that the rotation of the spur gears 51, when in mesh with the gears 53 will serve to rotate the sprockets 24, thus rotating the sprockets 57 by means of the sprocket chains 56 to transmit motion to the crawlers through the medium of the main sprockets 113. It can also clearly be seen that since each spur gear 51 is slidable on the shaft 27, into and out of operative relation with the gear 53, either one of the crawlers may be operated at will thus making it possible to steer the excavator by holding one set of crawlers out of operation, during operation of the other set.

I have provided a novel anti-friction means for supporting the turntable 1 of the excavator on the crawler chassis. This structure preferably takes the form of a ball race of novel form. This ball race is best shown in section in Figure 8.

Figure 8:
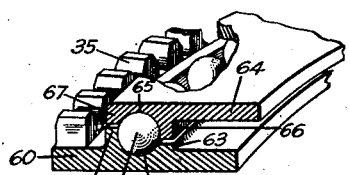
Figure 8 is a detail view in section showing my upper and lower ball bearing races mounted in cooperative relation.

This ball race comprises a lower annular member 60, Figure 2, that is mounted in concentric relation to the center pin 23 and on the crawler chassis 26. The annular member 60 also carries the annular rack 35. This rack 35, Figure 8, is formed integrally with the annular member 60. In Figure 8 of the drawings, the member 60 is shown as having its upper surface provided with an endless groove 61. This groove is substantially semi-circular in cross-section. The outer wall thereof, numbered 62, extends upwardly to a greater extent than the inner wall 63. This annular member 60 may be bolted or secured to the crawler frame in any manner desired.

The upper member of this ball race, which is numbered 64 is rigidly secured by bolts or rivets to the under side of the floor of the turntable 1. This member is also provided with a groove 65 adapted to cooperate with the groove 61 when the two annular members 60 and 64 are brought into cooperative relation. It will be seen that the groove 65 in the annular member 64 is provided with an inner wall 66 that is of substantially greater depth than the outer wall 67 thereof.

A plurality of anti-friction balls 68 are mounted in the annular groove formed by the cooperation of the semi-circular grooves 65 and 61. It will be apparent that the outer wall 62, of the lower member, extends into over-lapping relation with the inner wall 66 of the upper member. It is clearly shown that any lateral stress transmitted through the turntable to the depending wall 66 will force the ball 68 against the upstanding wall 67, but the height of this wall will preclude the unseating of the bearing. The result is that, in addition to the anti-friction effect such as would arise by the use of a ball race of usual form, my structure offers a resistance to all lateral thrusts to such an extent that all danger of undesirable tilting is eliminated. Furthermore, both the center pin with its anti-frictional bearing and this concentric anti-friction bearing just described combines to offer a smoothly operating efficient mounting for the cab on the crawler chassis. It will be understood that there will be a sufficient number of anti-friction balls 68 disposed within the annular groove to completely fill the groove.

Figure 10:
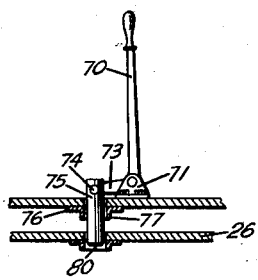
Figure 10 is a section showing the means for locking the cab to the crawler chassis.

When it is desired to transport the excavator from one point to another, it is extremely advantageous to preclude any movement of the cab on the crawler chassis. In order to accomplish this I have provided a pin, operable by a bell crank lever, that serves to maintain the cab in fixed position in line with the direction of travel of the crawlers. This structure is best shown in Figure 10. The numeral 70 designates a bell crank lever, also shown in Figures 1 and 2, that is pivotally supported on the floor of the turntable 1 on a supporting member 71. This supporting member 71 is drilled centrally and a pin is inserted therethrough and through a complemental opening in the lower end of the long arm of the lever. The short arm 73 of the bell crank lever projects at substantially right angles to the remainder of the lever. The short arm 73 is provided with a slotted opening at its outer end having a key 74 inserted therethrough. This key is also inserted through complemental openings in the upper end of a rod 75. The end of the rod 75 is bifurcated and the forward end of the short arm 73 lies therebetween. The pin 74 passes through the bifurcated ends of the rod 75 and the opening in the end of the extension 73. It will be noted that the pin 75 is mounted in a casting 76, having a central opening. This casting is rigidly secured to the bed 1 and has a depending portion as at 77 extending therebelow. The plate 26, mounted on the crawler chassis, is provided with an opening 80. This opening is in alignment with the casting 76 and pin 75 when the turntable is in alignment with the crawler chassis. It can clearly be seen that the pin 75 may be lowered or raised by means of the lever 70, to enter or leave the opening 80 in the plate 26.

Figure 3:
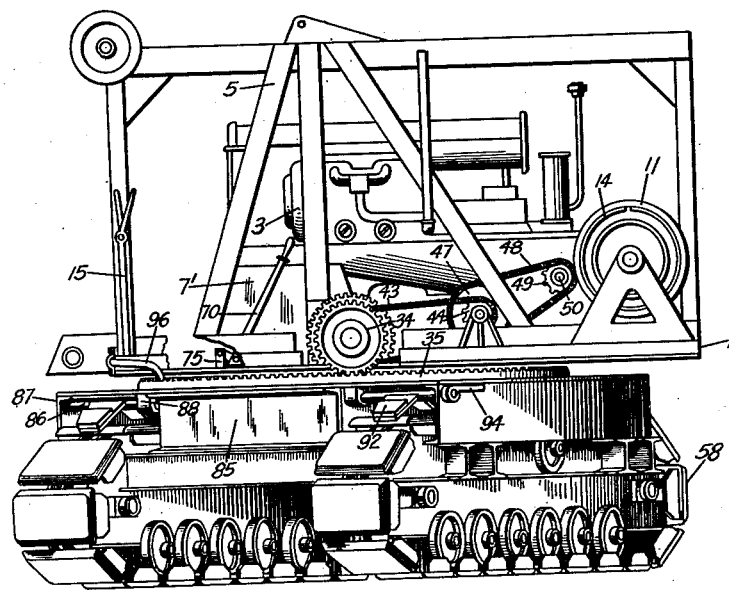
Figure 3 is a side elevation of the turntable and associated parts mounted on the chassis of an excavator which is shown in perspective to illustrate the locking means for the traction elements.

During rotation of the cab it is desirable that the lever 70 be operated to draw the pin 75 out of the opening 80, thus allowing the cab to freely revolve about its central axis, Figure 3. This locking mechanism is preferably disposed at the forward left-hand corner of the cab. When this cab is rotated to a position directly opposite to that shown in Figure 1, the cab may be also locked in that position by the provision of a second opening in the plate 26 in complemental alignment with the pin 75 thus making it possible to lock the cab in two positions. I do not wish to limit the exact place where I will mount this locking device inasmuch as it is possible to mount it more toward the center of the cab and to provide a plurality of complemental openings in the plate 26 whereby the cab may be locked at almost any position desired.

Figure 9:
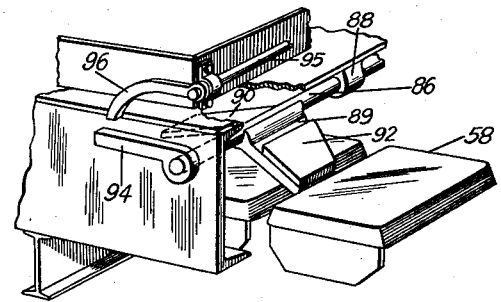
Figure 9 is a perspective view of the crawler lock and the operating mechanism therefor.
Figure 11:
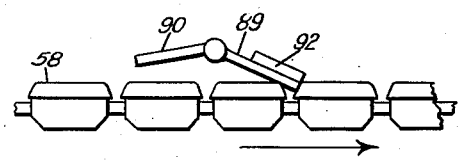
Figure 11 is a side elevation of a section of the crawler belt showing the normal position of the crawler lock with relation thereto.

I have also provided a novel means for locking the crawler members as shown in Figures 1, 9 and 11 against movement in either direction. These crawler locking members are mounted on a cross beam 85, forming the forwardmost cross brace of my excavator crawler chassis, Figures 1, 2 and 3. These locking means are identical and they are disposed directly above each crawler unit as shown.

Each unit comprises a transverse pin 86 journaled at the outer end in the side beam 87 and at the other end in a boss 88 formed on the cross brace 85. Each pin is provided with the shoes 89 and 90, Figure 9, formed integrally with the pin 86 and adapted to rock therewith. These shoes are disposed on the pin at an angle, Figure 11, of sufficient pitch to allow the rear shoes to clear the crawlers when the forward shoe is in engagement therewith.

It will be noted that the forward shoe 89 is provided with a weight 92 which may be riveted or bolted to the upper surface thereof or may be formed integrally therewith. The purpose of this weight is best illustrated in Figure 11, wherein it will be noted that the shoe 89 is always in engagement with the crawler shoes, owing to the greater weight which causes it to remain thereagainst. As the crawlers travel in the direction of the arrow, the shoe 89 merely rides the crawlers and does not interfere with the normal travel of the crawlers. If, for any reason, the excavator motor should be rendered in operative and allow the device to roll rearwardly, the plates 89 would automatically fall into the space intermediate the crawler plates and check movement of the axcavator, since the shoes 89 are always in contact with the crawlers, unless thrown out of operation by a means hereinafter described.

The outer end of the pin 86 is provided with an extension lever 94, Figure 9, which is preferably disposed on the outermost end of the pin 86, and on the exterior of the side beams 87, as shown in Figure 1.

This member is rotatable with the rod 86 and may be utilized as a means for controlling the shoes 89 and 90. I have provided a secondary lever 96 that is keyed to a shaft 95, Figure 9, the second lever being pivoted on the forward edge of the turntable 1 of the machine directly above the member 94 when the turntable is in alignment with the chassis. The shaft 95 may be rotated by means of any one of the levers 15. It will be noted in Figure 2 that the opposing crawler lock on the other side of the excavator is also provided with a control mechanism. It can readily be seen that when the shaft 95 is rotated the lever 96 will bear on the member 94, thus rocking the pin 86 and the shoes carried thereby. It can also clearly be seen that this lever will be utilized at two times, one when it is desirous to hold both shoes out of engagement with the crawlers, and when it is desirous to force the rear plate 90 into engagement with the crawlers.

During the operation of turning the whole excavator wherein one of the crawlers is driven while the other remains stationary, it is not always possible to turn the excavator by simply throwing one crawler out of operation. To positively ensure stopping of one of the traction elements, one of the shoes may be brought into engagement with the crawler plates thus checking the advance of that crawler while the other crawler is driven.

The numeral 99, Figure 3, designates a boom, which may be of any type common to excavating machines. This boom is preferably mounted for up and down movement on the forward end of the turntable 1 and it is rotatable therewith.

Thus, from the foregoing, it will be seen that I have contemplated the provision of an excavator of extremely simple nature, yet embodying many refinements over prior machines, especially in the advantageous co-relation of the various operating parts, and the ease with which such parts may be controlled. The term "a non-driving center pin bearing structure" as used in the claims refers to a center pin having no direct connection with the power transmitting mechanism of the excavator.

Having thus described my invention, what I claim is:

1. Excavating apparatus comprising a chassis, a turntable mounted on said chassis, a non-driving center pin bearing structure between said chassis and said turntable, said center pin structure being mounted in anti-friction bearings, and an annular anti-friction bearing structure disposed in surrounding and concentric relation to said center pin structure and serving to assist said center pin structure in preventing tilting of said turntable upon said chassis, said annular anti-friction bearing structure comprising ball bearings and opposed ball race members, each of said ball race members comprising a groove having vertically opposed side walls of unequal depth, said groove having side and bottom walls of the same curvature as said balls, one of said race members being mounted upon said chassis and the other on said turntable, the side wall of said turntable raceway which is closest to said center pin structure being of greater depth than the complemental wall of said chassis raceway and being in cooperative relation with said complemental wall of said chassis raceway and the side walls of said turntable raceway lying directly over the side walls of said chassis raceway.

2. Excavating apparatus comprising a chassis, an annular rack mounted on said chassis, a ball race member carried by said rack, a plurality of balls in said ball race member, a non-driving center pin bearing structure mounted in anti-friction bearings on said chassis, a turntable having a ball race member supported by said center pin structure, said turntable ball race member resting on and partially enclosing said balls, each of said ball race members comprising a groove having vertically opposed side walls of unequal depth, said groove having side and bottom walls of the same curvature as said balls, the side wall of said turntable raceway which is closest to said center pin structure being of greater depth than the complemental wall of said chassis raceway and being in cooperative relation with said complemental wall of said chassis raceway and the side walls of said turntable raceway lying directly over the side walls of said chassis raceway, and means for adjusting said center pin structure.

In testimony whereof I, hereby affix my signature.

EARL H. FUNDOM.